United States Patent Office 3,142,756
Patented July 28, 1964

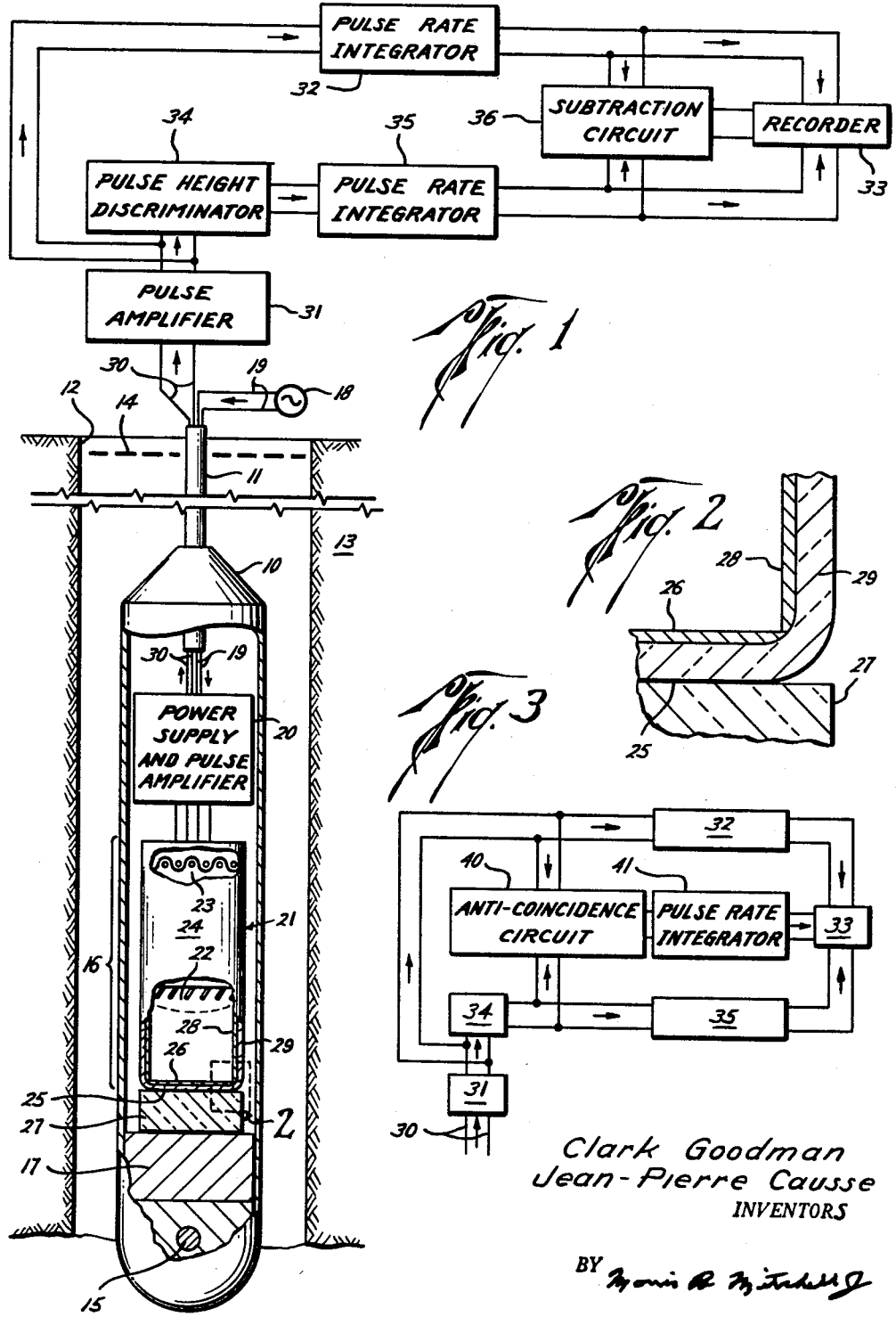

3,142,756
PHOTOMULTIPLIER TUBE WITH TUBULAR CATHODE BONDED TO THE INTERIOR SURFACE THEREOF
Clark Goodman, Houston, Tex., and Jean-Pierre Causse, Ridgefield, Conn., assignors to Schlumberger Well Surveying Corporation, Houston, Tex., a corporation of Texas
Filed Nov. 23, 1959, Ser. No. 854,891
1 Claim. (Cl. 250—71.5)

This invention relates to radiation-responsive apparatus and, more particularly, pertains to new and improved apparatus for deriving indications in response to a plurality of types of radiant energy which may be present in a borehole that is drilled into earth formations. The term "radiant energy" as used herein is intended to denote both particle energy and wave energy. Within this definition, neutrons and gamma radiation are examples of different types of radiant energy.

In radioactivity well logging, a source of radiant energy which emits neutrons, for instance, is passed through a borehole together with a detector that is adapted to respond to a phenomenon resulting from neutron radiation of the earth formations. The detector may be responsive either to slow neutrons or gamma radiation thus providing useful information concerning the earth formations, such as hydrogen content. For certain applications measurements of both the resulting slow neutrons and gamma radiation are desired. Thus, two detection systems are needed and the borehole instrument may become undesirably complex and large.

It is, therefore, an object of the present invention to provide new and improved radiation-responsive apparatus for obtaining indications of a plurality of types of radiant energy in a borehole in a unique and highly effective manner.

Another object of the present invention is to provide new and improved radiation-responsive apparatus for obtaining indications of a plurality of types of radiant energy featuring an instrument adapted to be passed through a borehole that is comparatively simple in construction and of relatively small size.

A further object of the present invention is to provide a new and improved well logging instrument for measuring gamma radiation and neutrons either separately or simultaneously during a single traverse of a borehole.

These and other objects of the present invention are attained by radiation-responsive apparatus comprised of a support adapted to be passed through a borehole and a detection system carried by the support. The detection system includes an envelope, means disposed within said envelope for driving electrons in response to incident light energy, a scintillator optically coupled to the first-mentioned means and responsive to incident radiant energy of one type to produce light energy, means disposed within said envelope and responsive to incident radiant energy of another type to produce electrons, and means disposed within said envelope for providing an electrical pulse in response to the presence of a free electron. The apparatus further comprises indicating means electrically coupled to the last-mentioned means.

The novel features of the present invention are set forth with particularity in the appended claim. The present invention, both as to its organization and manner of operation, together with further objects and advantages thereof, may best be understood by reference to the following description taken in connection with the accompanying drawing in which:

FIG. 1 is an elevational view in partial longitudinal cross section of a borehole logging instrument provided with radiation-responsive apparatus embodying the present invention shown together with the associated surface equipment;

FIG. 2 is an enlarged cross-sectional view of the portion of the apparatus of FIG. 1 enclosed by a broken line rectangle 2; and FIG. 3 represents a circuit modification which may be made to the apparatus of FIG. 1.

In FIG. 1 of the drawing, radiation-responsive apparatus constructed in accordance with the present invention is shown to include a housing or support 10 suspended by an armored electric cable 11 in a borehole 12 which penetrates earth formations 13. The borehole 12 may be empty or it may contain the usual drilling mud 14, as shown. Cable 11 is usually spooled on a winch (not shown) located at the surface of the earth and thus the housing 10 may be lowered and raised through the borehole 12 in the customary manner.

Within a lower end portion of housing 10 is supported a radiant energy source 15 which may be composed of any of a variety of substances adapted to emit neutrons or it may be a neutron accelerator. For example, the source 15 may be a mixture of polonium and beryllium or a mixture of plutonium and beryllium or a neutron accelerator which produces neutrons through the deuterium-tritium reaction and which are adapted to emit neutrons of relatively high energies for irradiating earth formations 13. As is well known, the neutrons which enter formations 13 undergo a process which slows them to relatively low energies and some of the slow neutrons may return toward housing 10. At the same time, some of the slow neutrons in the formations 13 may undergo a process referred to as capture in nuclei of a constituent of the formations. Such capture is often accompanied by the emission of gamma radiation and some of the resulting gamma radiation is returned toward housing 10. Thus, radiation of two types may impinge upon a radiant energy detector 16 disposed within housing 10 and separated from source 15 by a neutron and gamma ray shield 17 composed, for example, of lead.

To provide electrical energy for the detection system 16, an electrical energy source 18 at the surface of the earth is connected by electrical conductors 19 of cable 11 to a power supply and pulse amplifier unit 20 of conventional construction supported within housing 10. The power supply portion of unit 20 operates in a well-known manner to provide the necessary potentials for operating a photomultiplier 21 that is also supported within housing 10. The photomultiplier 21 may be constructed in a known manner; for example, it may be of the type disclosed in Patent No. 2,866,914 which issued on December 30, 1958, to A. Lallemand. In general, it is comprised of an electron multiplier assembly which includes a series of dynodes, such as the one designated by the numeral 22 and an anode 23 all supported within a generally cylindrical or tubular envelope 24. These elements are suitably energized by power supply 20 so that an electrical pulse is generated in response to the presence of a free electron within the envelope 24 drawn in secondary-emitting relation against the first dynode 22.

Envelope 24 is preferably constructed of shock-resistant glass capable of withstanding externally applied pressures and serving as an electrical insulator. At one end of the envelope 24 a light-admitting closure 25 provides a window which is transparent to radiation such as light-quanta or photons. Supported interiorly of envelope 24 is a photocathode 26 disposed in a layer on the inner surface of window 25. Any of a variety of known photosensitive compositions may be employed in constructing photocathode 26, each having the characteristic of emitting electrons known as photoelectrons upon the incidence of radiation which may be in the form of light energy passing through the window 25. For example, the photosensitive layer 26 may be composed of caesium-antimony, or any of a variety of intermetallic compounds of alkali metals and antimony, selenium, tellurium or bismuth.

A gamma radiation-responsive scintillator 27 is positioned outside envelope 24 adjacent to window 25 and is optically coupled to the photocathode 26. The scintillator may be of any known type which emits quanta of light energy in response to the absorption of quanta of gamma radiation. For example, it may be composed of sodium-iodide activated with thallium.

Also disposed within envelope 24 is a neutron-sensitive layer 28 deposited on an annular portion 29 of the envelope adjacent to window 25, as may be more clearly seen in FIG. 2. Layer 28 is composed of a material such as lithium of atomic weight 6 which undergoes the neutron reaction $Li^6(n,\alpha)H^3$ when struck by a neutron. The layer 28 also includes a photoemissive material which may be composed of any of the compounds discussed in connection with layer 26 so as to be responsive to both alpha particles ($\alpha$) and tritons ($H^3$) in releasing electrons. The neutron sensitive material and the photoemissive material may be either in the form of separate, superposed layers or in the form of a mixture. In either case, layer 28 can be prepared in accordance with well-known techniques.

Alternatively, instead of photosensitive material in layer 28, a secondary-emitting material may be evaporated onto a lithium layer, thus reducing tube noise. For example, copper-beryllium or silver-magnesium alloys may be employed. Preferably, the same secondary-emitting material utilized for the photomultiplier dynodes (such as the dynode 22 in FIG. 1) should be used although this is not entirely essential.

If the same secondary-emitting material is used for both the dynodes and the coating used in conjunction with the lithium, construction of the tube is greatly simplified because both depositing operations can be conducted at one time, with one operation and with one material. Further, there is no need to insulate one operation from the other to eliminate possible poisoning of the emitting surfaces by the other material. This advantage will carry over when the tube is placed in use and any possible intraction between the surfaces will have no adverse effects.

In operation electrons from either of layers 26 and 28 actuate the electron multiplier which includes elements 22 and 23 to provide an electrical signal of useful amplitude. Further amplification for that signal is provided in the pulse amplifier portion of unit 20 and the output circuit of the amplifier is coupled by insulated electric conductors 30 of cable 11 to a pulse amplifier 31 located at the surface of the earth. The output circuit of amplifier 31 is connected to a pulse rate integrator which derives a voltage whose amplitude is dependent upon the rate of occurrence of the pulses supplied by the amplifier 31. The integrator 32, in turn, is coupled to a recorder 33 in which the recording medium is driven in proportion to movement of housing 10 through borehole 12.

The output circuit of amplifier 31 is also coupled to a pulse height discriminator 34 which is arranged in a known manner to pass all pulses having an amplitude greater than a selected level. The discriminator output circuit is coupled to another pulse rate integrator 35 and the integrator 35 is, in turn, coupled to another channel of recorder 33. The integrators 32 and 35 are also coupled to a subtraction circuit 36 which derives a voltage dependent upon the algebraic difference between the applied voltages and the output circuit of subtraction circuit 36 is coupled to still another channel of recorder 33.

All of the elements 20, 31, 32, 33, 34, 35 and 36 may be of well-known construction and, hence, a detailed description thereof is deemed unnecessary.

In operation, as housing 10 passes through borehole 12, neutrons from source 15 irradiate earth formations 13 and give rise to both slow neutrons and gamma radiation, as explained earlier. Some of this resulting radiation radiates into the borehole 12 and is incident on detection apparatus 16. Some of the gamma radiation which intercepts scintillator 27 reacts in a known manner to produce scintillations or light flashes that pass through window 25 and illuminate photocathode 26. Thus, each quantum of gamma radiation provides a light flash which causes photocathode 26 to emit one or a few electrons and by the action of the photomultiplier array including elements 22 and 23, a corresponding signal pulse of useful amplitude is derived and supplied to the amplifier portion of unit 20. However, the gamma radiation which passes through layer 28 will not generally be intercepted thereby. At the same time, each neutron which is captured in layer 28 within envelope 24 produces the reaction $Li^6(n,\alpha)H^3$ and both the alpha particle and triton are effective in releasing electrons from layer 28. Accordingly, multiplier assembly 22–23 is actuated to produce a signal pulse substantially larger in amplitude than the signal pulse produced in response to a gamma ray that is incident in scintillator 27. Further, the neutrons which enter the scintillator 27 will not generally be captured therein. Hence, each intercepted gamma ray in the photomultiplier will ordinarily produce a small signal pulse while each captured neutron will ordinarily produce a substantially larger signal pulse.

Pulses caused by both gamma radiation and neutrons are applied to the amplifier portion of unit 20 and amplified versions of these pulses are supplied over conductors 30 of cable 11 to pulse amplifier 31. After further amplification, the pulses from amplifier 31 are supplied to integrator 32 and a voltage dependent upon both the flux of gamma radiation and the flux of neutrons incident on detection system 16 is developed and supplied to recorder 33. Thus, a composite record is obtained of a combination of these fluxes as a function of the depth of housing 10 in the borehole 12.

At the same time, the output of amplifier 31 is supplied to discriminator 34 and only those pulses having an amplitude greater than a selected level are passed to integrator 35. As pointed out earlier, the pulses arising as a result of neutrons incident on layer 28 are of much greater amplitude than those produced by gamma rays and thus only the pulses representing incident neutrons are supplied to integrator 35 and a corresponding voltage is developed and applied to recorder 33. Accordingly, a record of the neutrons arising as a result of neutron bombardment of formations 13 is obtained.

Since subtraction circuit 36 derives the difference between the voltages present in integrators 32 and 35, it is evident that the output of subtraction circuit 36 represents the gamma radiation resulting from neutron bombardment of formations 13. Consequently, this information is recorded on still another track of recorder 33.

It is therefore evident that apparatus embodying the present invention is adapted to provide neutron-neutron and neutron-gamma ray logs simultaneously. Moreover, from the foregoing description of the apparatus and from an inspection of the drawing, it is evident that the apparatus embodying the present invention requires only a single photomultiplier tube and a single electrical channel in the borehole instrument 10. Thus, the apparatus is of relative small size and of comparatively simple construction.

Obviously, the size of scintillator 27 may be selected to serve any of various requirements. Thus, it may be thick enough to absorb gamma rays of all energies to be anticipated. Its length may be selected in a known manner to provide a desired compromise between counting rate and vertical resolution. The size of neutron-sensitive layer 28 may be similarly selected. It is evident that since both scintillator 27 and layer 28 extend longitudinally relative to housing 10, each responds efficiently to its respective type of radiant energy which emanates from formation 13 and passes transversely through the wall of borehole 12. Thus, the unique structural arrangement featured in apparatus embodying the present invention permits response to different types of radiant energy in a highly effective and efficient manner without undue complexity in the borehole instrument. Further, since scintillator 27 and layer 28 are usually of sizes measured in inches and are physically close to one another, the indications of neutron flux and gamma radiation flux are closely correlated in depth and there is little or no need for a mechanism to provide a depth shift prior to recording.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

In the circuit modification illustrated in FIG. 3, subtraction circuit is omitted, but integrators 32 and 35 operate as in FIG. 1 to develop voltages representing the composite neutron-gamma ray flux and the neutron flux, respectively, that is incident on detector 16. The outputs of amplifier 31 and pulse height discriminator 34 are supplied to a conventional anti-coincidence circuit 40 so that only pulses representing gamma radiation are fed to another integrator 41. Thus, a voltage representing the gamma ray flux at detector 16 is fed to one channel of recorder 33.

What is claimed is:

Radiation-responsive apparatus comprising a photomultiplier including a cylindrical glass envelope having a flat end wall for coupling with a scintillation crystal, a semi-transparent photocathode composed of electron-emissive material formed on the interior face of said end wall and coextensive therewith, at least a first dynode and an anode spaced successive distances from said photocathode axially within said envelope, and a tubular electron emissive cathode bonded to the cylindrical interior face of said envelope and extending from said photocathode a distance short of said first dynode and composed of neutron reactive lithium-6 and a secondary-electron emissive material, said cathodes being electrically conductive and arranged to emit electrons into secondary emitting relation to said first dynode upon the application of suitable potentials to said cathodes, anode and dynode, said dynode and said cathodes employing the same secondary-electron emissive material.

References Cited in the file of this patent

UNITED STATES PATENTS

| | | |
|---|---|---|
| 2,297,478 | Kallmann et al. | Sept. 29, 1942 |
| 2,521,133 | Snell et al. | Sept. 5, 1950 |
| 2,525,832 | Sheldon | Oct. 17, 1950 |
| 2,534,932 | Sun | Dec. 19, 1950 |
| 2,588,789 | Zinn | Mar. 11, 1952 |
| 2,830,184 | Scherbatskoy | Apr. 8, 1958 |
| 2,854,584 | Youmans | Sept. 30, 1958 |
| 2,910,592 | Armistead | Oct. 27, 1959 |
| 2,920,204 | Youmans | Jan. 5, 1960 |
| 2,971,094 | Tittle | Feb. 7, 1961 |
| 2,991,364 | Goodman | July 4, 1961 |
| 2,994,769 | Sun et al. | Aug. 1, 1961 |
| 2,994,773 | Sternglass | Aug. 1, 1961 |

OTHER REFERENCES

Neutron Sensitive Electron Multiplier Tubes, by G. F. Erickson et al., from the Review of Scientific Instruments, vol. 27, No. 2, February 1956; page 107.